United States Patent
Oishi

(10) Patent No.: US 8,139,311 B2
(45) Date of Patent: Mar. 20, 2012

(54) APPARATUS, METHOD AND PROGRAM FOR CONTROLLING WRITING OF DATA BY TAPE RECORDING APPARATUS

(75) Inventor: Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/210,345

(22) Filed: Sep. 15, 2008

(65) Prior Publication Data

US 2009/0103205 A1  Apr. 23, 2009

(30) Foreign Application Priority Data

Oct. 17, 2007  (JP) ................................. 2007-269995

(51) Int. Cl.
*G11B 21/02* (2006.01)
*G11B 15/04* (2006.01)
(52) U.S. Cl. ....................... 360/77.12; 360/60
(58) Field of Classification Search .................. None
See application file for complete search history.

(56) References Cited

U.S. PATENT DOCUMENTS

| | | | |
|---|---|---|---|
| 5,485,321 A * | 1/1996 | Leonhardt et al. | 360/48 |
| 5,546,557 A | 8/1996 | Allen et al. | |
| 5,627,694 A * | 5/1997 | Ido et al. | 360/51 |
| 5,710,676 A * | 1/1998 | Fry et al. | 360/72.1 |
| 6,349,356 B2 * | 2/2002 | Basham et al. | 711/111 |
| 6,424,478 B2 * | 7/2002 | Hamai et al. | 360/48 |
| 7,372,657 B2 * | 5/2008 | Gill et al. | 360/74.1 |
| 2003/0067627 A1 * | 4/2003 | Ishikawa et al. | 358/1.15 |
| 2008/0294954 A1 * | 11/2008 | Katagiri et al. | 714/727 |

FOREIGN PATENT DOCUMENTS

| | | |
|---|---|---|
| JP | 7084839 A1 | 3/1995 |
| TW | 286017 | 8/2008 |

* cited by examiner

*Primary Examiner* — K. Wong
(74) *Attorney, Agent, or Firm* — Michael J. LeStrange

(57) ABSTRACT

A technique for improving the performance of head alignment during reading of data from and writing data to a tape medium. An apparatus controls writing of data by a tape drive that drives a tape medium in both forward and reverse directions to record data. The apparatus includes a position obtaining unit that obtains the current position of the head of the tape drive with respect to the tape medium, a determining unit that determines whether the current position of the head is within a predetermined range on the tape medium, a generating unit that generates dummy data in response to determination that the current position of the head is not within the predetermined range, and a write control unit that writes dummy data on the tape medium until the current position of the head is within the predetermined range on the tape medium.

17 Claims, 10 Drawing Sheets

APPARATUS, METHOD AND PROGRAM FOR CONTROLLING WRITING OF DATA BY TAPE RECORDING APPARATUS

CROSS-REFERENCE TO RELATED APPLICATION

The foregoing U.S. Patent Application claims priority to Japanese published, unexamined, Patent Application No. 2007-269995 filed Oct. 17, 2007.

FIELD OF THE INVENTION

The present invention relates to a tape recording apparatus that records data by driving a tape medium in both forward and reverse directions along its length, and in particular, to a technique for improving the performance of alignment of a head of a tape recording apparatus with respect to the tape medium during reading data from and writing data onto the tape medium.

BACKGROUND OF THE INVENTION

Recording and reproduction media include flexible disks, magnetic drums, hard disks, and magnetic tapes. Magnetic tapes are playing an important role in data backup among other usages because they have large storage capacities and are inexpensive. Today, tape drives are also expected to be a green storage because of their efficiency and low energy consumption.

However, data read and write performance of tape drives is significantly lower than that of hard disk drives. Although tape drives have transfer rates comparable to hard disk drives, tape drives, which support sequential access, require more time for alignment of the head with the desired data location on the magnetic tape. Hard disk drives support random access and are not limited to sequential access.

Therefore, an object of the present invention is to provide an apparatus, method, and program that control writing of data by a tape recording apparatus and are capable of solving the problem described above. That is, an object of the present invention is to improve data read and write performance by reducing the time required for alignment during reading and writing data.

SUMMARY OF THE INVENTION

Figure 1A:
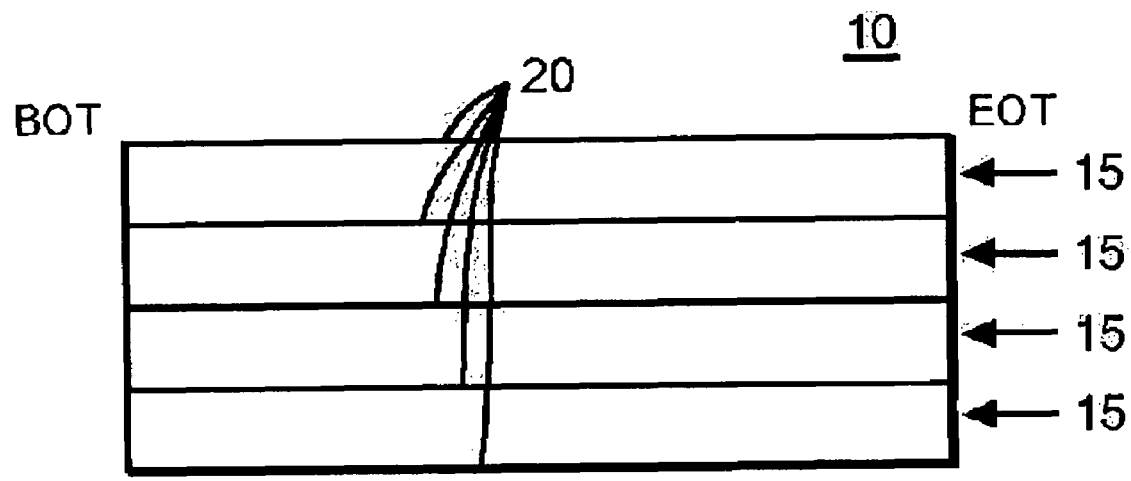
FIG. 1(a) is a diagram showing an exemplary configuration of a recording area of a tape medium conforming to the LTO standard.

The present invention is implemented by an apparatus that controls writing data of a tape recording apparatus by driving a tape medium in both forward and reverse directions along its length to record data as described below.

The apparatus includes an obtaining unit, which records a current position of a head of the tape recording apparatus on the tape medium, a determining unit, which determines whether or not the current position of the head is within a predetermined range on the tape medium, a generating unit, which generates dummy data in response to a determination that the current position of the head is not within the predetermined range, and a write control unit, which writes the dummy data on the tape medium until the current position of the head on the tape medium falls within the predetermined range.

Preferably, the tape medium has multiple bands arranged along the length of the tape medium and the predetermined range is a portion of the beginning of any of the bands. The portion of the beginning of the band is defined by the time allowed for the tape medium to achieve alignment. That is, the portion of the beginning of the band is an area across which the current position of the writing head on the tape medium moves while the tape medium is being run from the start point of a data writable area on the tape medium for the allotted time.

Preferably, the generating unit generates dummy data having a predetermined size. The write control unit directs the determining unit and the generating unit to repeat their respective processing until it is determined that the current position of the head with respect to the tape medium is within the predetermined range.

Preferably, the generating unit calculates the size of dummy data required for the current position of the head on the tape medium to fall within the predetermined range using the obtained current position of the head with respect to the tape medium and the direction in which the tape medium is running. The generating unit generates dummy data having the calculated size to achieve this goal.

Preferably, the control apparatus further includes an idle state detecting unit detecting an idle state of the tape recording apparatus and a drive control unit directing to drive the tape medium in response to detection of the idle state so that the head is positioned at the end of data already written. The position obtaining unit obtains the current position of the head on the tape medium in response to the end of running of the tape medium.

The tape recording apparatus includes a tape drive writing data on the tape medium, a controller controlling writing of data by the tape drive; and a communication unit communicating with a host computer through a network. The controller includes a position obtaining unit for obtaining a current position of a head of the tape recording apparatus with respect to the tape medium in response to receiving a special command at the communication unit from the host computer, a determining unit for determining whether the obtained current position of the head is within a predetermined range on the tape medium, a generating unit for generating dummy data in response to a determination that the obtained current position of the head is not within the predetermined range; and a write control unit for writing the dummy data on the tape medium until the current position of the head on the tape medium is within the predetermined range.

The present invention is implemented by a host computer coupled to a tape recording apparatus through a network. The tape recording apparatus drives a tape medium in both forward and reverse directions along the length of the tape medium to record data.

The host computer includes a communication unit for communicating with the tape recording apparatus; a first control unit sending a head move command for moving a head of the tape recording apparatus and a write command to the tape recording apparatus through the communication unit to direct the tape recording apparatus to write data; and a controller for controlling writing of data onto the tape medium. The controller includes a position obtaining unit for obtaining the current position of the head of the tape recording apparatus with respect to the tape medium through the communication unit in response to receiving a notification of the end of tape medium movement, or a notification of the completion of a data write operation from the first control unit, a determining unit for determining whether current position of the head received from the tape recording apparatus through the communication unit is within a predetermined range on the tape medium, a generating unit generating dummy data in response to determination that the current position of the head received is not within the predetermined range; and a second control unit for controlling the tape recording apparatus via the communication unit to write the dummy data on the recording medium until the current position of the head with respect to the tape medium is within the predetermined range.

While the present invention has been described as a control apparatus that controls writing of data by a tape recording apparatus that drives a tape medium to run in both forward and reverse directions along its length to record data, and a tape recording apparatus or a host computer including such a control apparatus, the present invention can be viewed as a control method, a control program, or a storage medium on which a control program is stored, which is executed on an apparatus to control writing of data on a tape medium.

According to the present invention, the time required for alignment during reading data and writing data is reduced and the performance of alignment is significantly improved because dummy data is used to adjust the end of data written on a tape medium or a position in which data is overwritten to ensure that the end or the position is always positioned near the beginning of a data-writable area on the tape medium.

The best mode for carrying out the present invention will be described below in detail with reference to drawings. However, the embodiments described below are not intended to limit the present invention, which is defined in the Claims, and not all combinations of features described in the embodiments are essential to the inventive means for solving the problem. Throughout the description of the embodiments, like elements are labeled with like reference numerals.

The present invention will be described below with respect to a tape recording apparatus conforming to the LTO (Linear Tape Open) standard by way of example. However, application of the present invention is not limited to a tape recording apparatus conforming to the LTO standard and a host computer connected to such tape recording apparatus. The present invention has an advantageous effect on any tape recording apparatus that records data by driving a tape medium in both forward and reverse directions along its length. The LTO standard is an open format standard jointly developed by Hewlett-Packard L.P., IBM® Corporation and Seagate (today known as Quantum® Corporation).

A configuration of recording areas of a tape medium conforming to the LTO standard and a data writing method will be described first with reference to FIG. 1. The tape medium 10 has multiple bands 15 arranged along the length of the tape medium 10 from the BOT (Beginning of Tape) to the EOT (End of Tape) as shown in FIG. 1(a). Servo tracks 20 are provided along the length on both sides of each of the multiple bands 15 for controlling data writing positions.

Figure 1B:
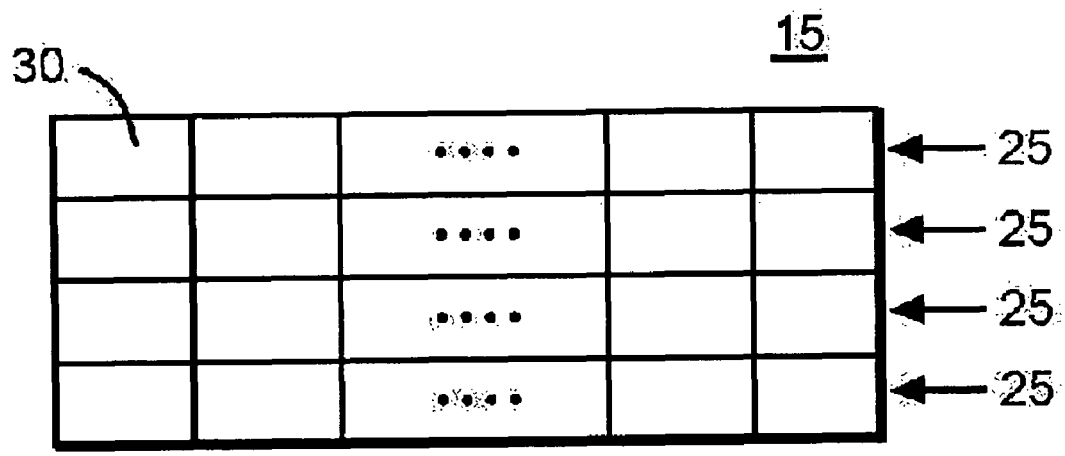
FIG. 1(b) is a diagram showing an exemplary configuration of a recording area of a tape medium conforming to the LTO standard.

Each band 15 has multiple data tracks 25 arranged along the length of the tape medium 10 as shown in FIG. 1(b). The width of data tracks 25 along the width of the tape medium 10 is the width across which data is written by the tape recording apparatus at a time. Each data track 25 has multiple blocks 30 along the length of the tape medium 10. Each block 30 has multiple data sets (DSs), each having multiple CQs (Codeword Quads), each of which is an example of a data unit that is written as a unit. For example, when all CQs have been successfully written, the DS consists of 64 CQs.

A tape recording apparatus conforming to the LTO standard sequentially writes data, starting from the beginning of a tape medium 10 that uses the configuration of the recording area described above. In practice, writing of data is not started from the BOT (corresponding to LP2 in FIG. 1(c)) of the tape medium 10; instead, writing of data starts from a position called LP3, at a slight distance beyond the BOT as shown in FIG. 1(c).

Figure 1C:
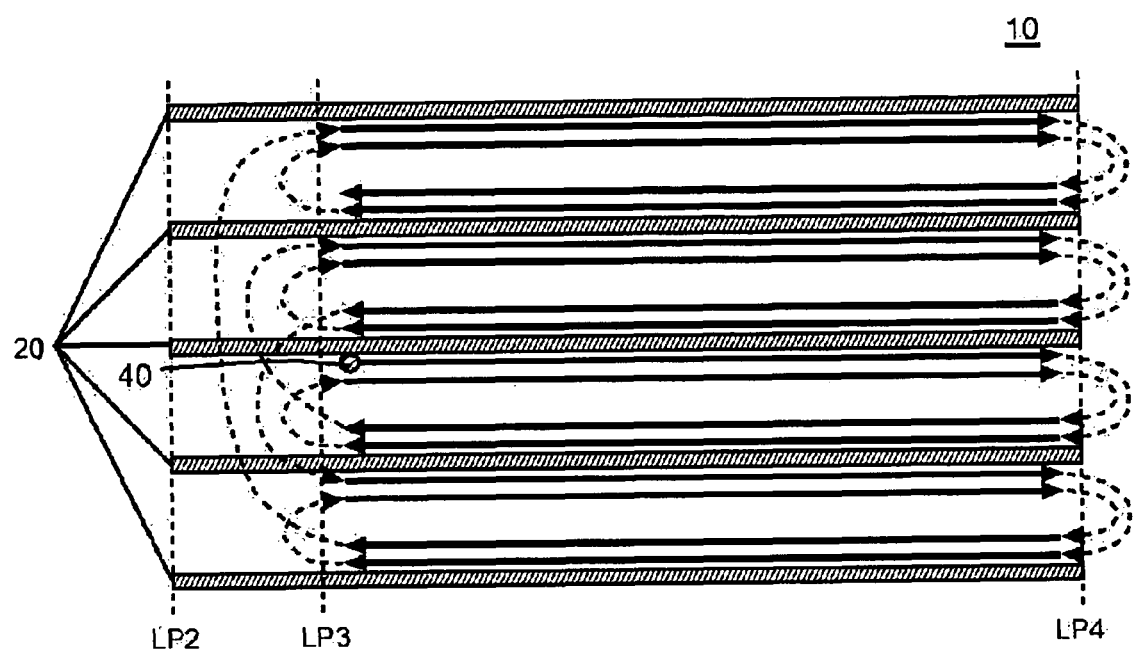
FIG. 1(c) is a diagram showing a data write scheme for a tape medium conforming to the LTO standard.

When data is written on the tape medium 10 for the first time, the tape recording apparatus writes the data from the position indicated by reference numeral 40 in FIG. 1(c), that is, near LP3 toward LP4 of data band 0. After data is written up to the end of the tape medium 10, the tape recording apparatus reverses the tape driving to the direction from LP4 toward LP3 as indicated by the arrows in FIG. 1(c) and continues writing data. When new data is to be written, the tape recording apparatus writes the data from the position next to the last data written on the tape medium 10.

Because a tape recording apparatus, which is a sequential access device, drives a tape medium 10 in both forward and reverse directions along its length to sequentially record data as described above, the beginnings of data except for the first of the data written are located in arbitrary positions of the tape medium 10. Accordingly, when data is read or added, the beginning of the data to be read or the position in which the next data is to be written is not always at the beginning of the tape medium 10. When the position is not at the beginning of the tape medium 10, tape medium 10 must be driven to a target position. The alignment operation may take a significant time.

Therefore, the present invention uses dummy data to adjust the position in which data is to be written so that the end of data to be written on a tape medium 10 or the position in which data is to be overwritten always falls near the beginning of the tape medium 10. As a result, the time required for tape alignment during reading or writing data is reduced.

Figure 2:
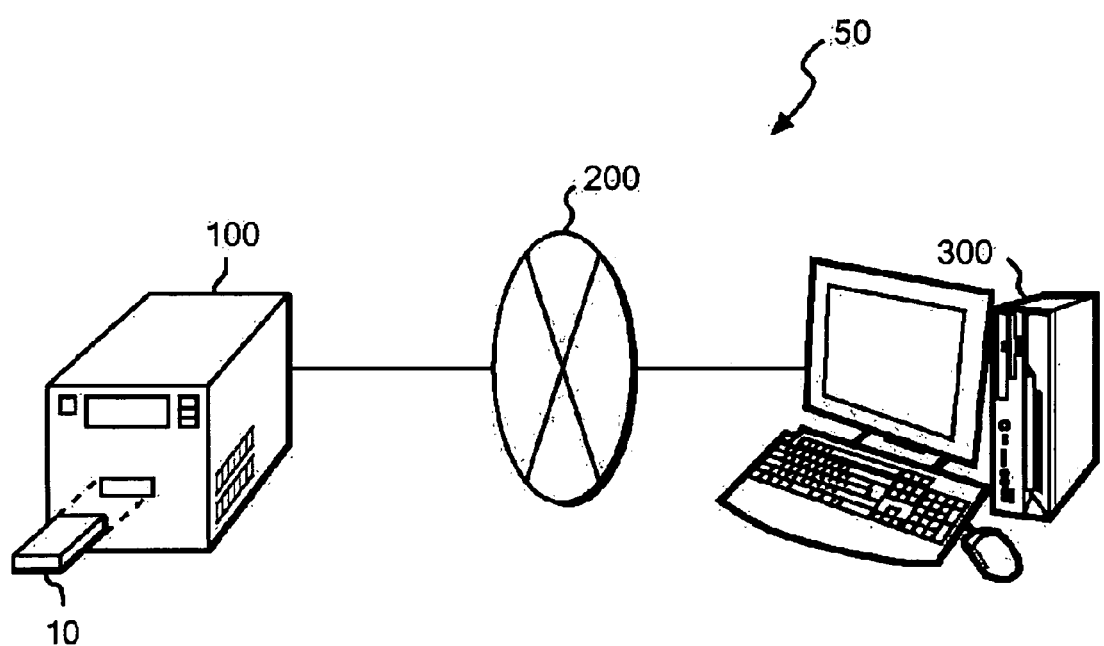
FIG. 2 is a diagram showing an exemplary system including a tape recording apparatus 100 and a host computer 300 according to an embodiment.

The present invention can be implemented in any tape recording apparatus 100 that drives a tape medium 10 in both forward and reverse directions along its length to record data, and a host computer 300 that is connected to the tape recording apparatus 100 through a network 200. FIG. 2 shows an entire system including a tape recording apparatus 100 and a host computer 300. The tape recording apparatus 100 and the host computer 300 are interconnected through a network 200. Network 200 may be any type of network, for example, SCSI (Small Computer System Interface), LAN (Local Area Network), a private network or the Internet. Alternatively, the tape recording apparatus 100 may be connected to an information processing apparatus such as a personal computer through a communication interface such as SCSI or a LAN and connected to the host computer 300 through the information processing apparatus.

Figure 3:
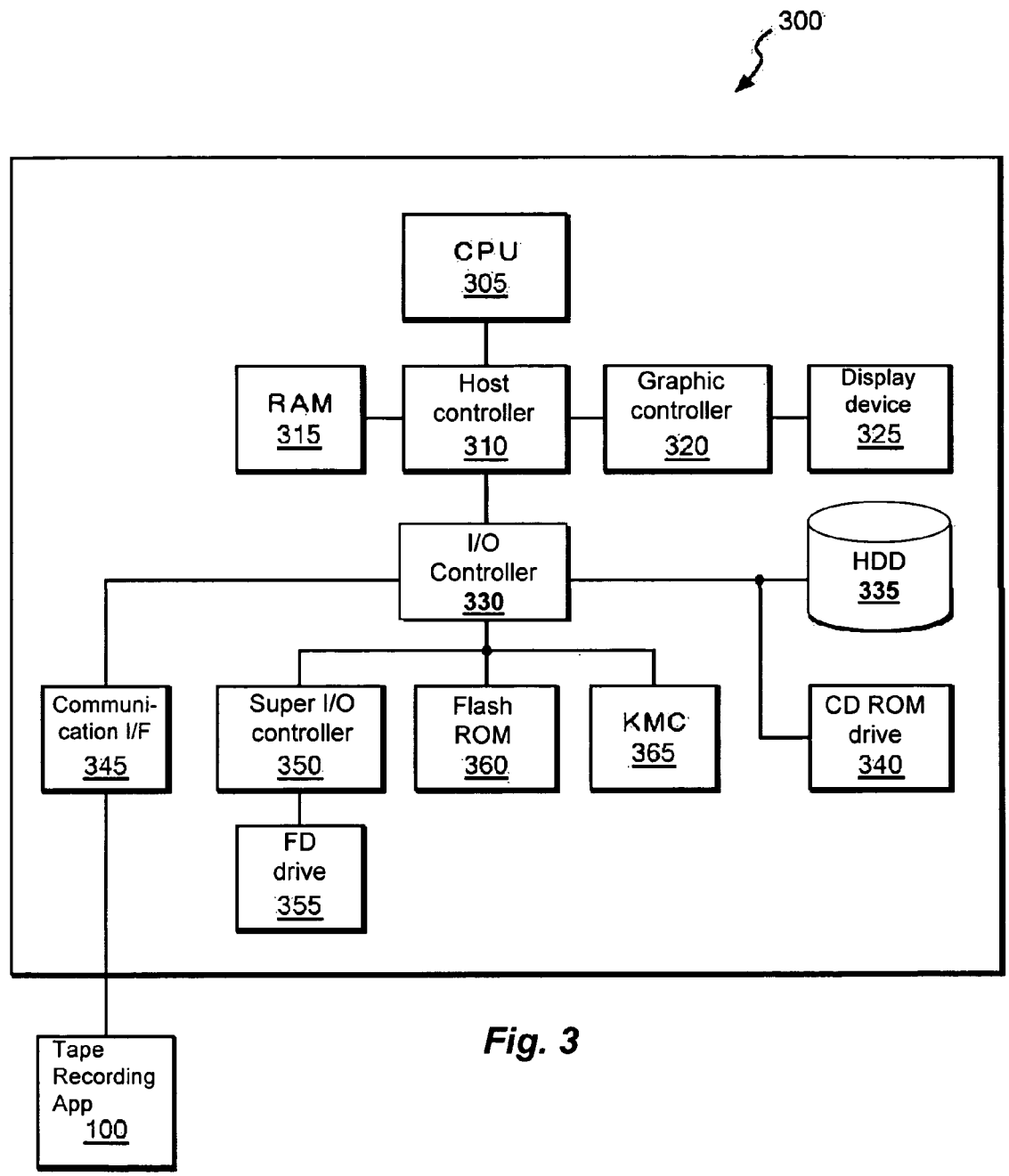
FIG. 3 is a diagram showing an exemplary hardware configuration of the host computer 300 according to the present embodiment.

An embodiment of the invention is described below using a host computer 300 for illustration purposes. FIG. 3 shows an exemplary hardware configuration of a host computer 300 to which the example embodiment of the present invention is applied. The host computer 300 includes a CPU unit including a CPU 305, a RAM 315, a graphic controller 320, and a display device 325 interconnected through a host controller 310, an input/output unit including a communication interface 345, a hard disk drive 335, and a CD-ROM drive 340 connected to the host controller 310 through an input/output controller 330, and a legacy input/output unit including a super I/O controller 350 connected to the input/output controller 330, and a flexible disk drive 355 connected to the super I/O controller 350, a flash ROM 360, and a keyboard/mouse controller 365.

The host controller 310 connects the RAM 315 to the CPU 305 and the graphic controller 320 which accesses the RAM 315 at a high transfer rate. CPU 305 operates according to a program stored in hard disk drive 335 and controls each component. A control program that controls writing of data in a tape recording apparatus 100 that drives a tape medium in both forward and reverse directions along the length of a tape medium to record data according to the present invention, is stored in hard disk drive 335 and is executed by the CPU 305 using the RAM 315.

The computer program product causes the host computer 300 to function as a controller that controls data write operations by the tape recording apparatus 100 using dummy data so that the end of data to be written on a tape medium 10 or a data overwrite position always falls near the beginning of the tape medium 10. Other details and operations of the control program will be described later with reference to FIGS. 4 and 5. The graphic controller 320 obtains image data generated by the CPU 305 and other elements on a frame buffer provided in the RAM 315, and displays it on the display device 325. Alternatively, the graphic controller 320 may include a frame buffer that stores image data generated by the CPU 305 and other elements.

The input/output controller 330 connects the communication interface 345, the hard disk drive 335, and the CD-ROM drive 340, which are relatively fast input/output devices, to the host controller 310. The communication interface 345 connects to a network through a communication adapter (such as an Ethernet® card or a token ring card) and communicates with an external device such as the tape recording apparatus 100. The CD-ROM drive 340 reads a program or data from a CD-ROM and provides it to the CPU 305 through the RAM 315.

Connected to the input/output controller 330 are relatively slow input/output devices such as the flexible disk drive 355, the keyboard/mouse controller 365, and the flash ROM 360. The flash ROM 360 stores programs such as a boot program executed by the CPU 305 during boot-up of the host computer 300 and programs which depend on the hardware of the host computer 300. The flexible disk drive 355 reads a program or data from a flexible disk and provides it to the CPU 305 through the RAM 315. The super I/O controller 350 connects various input and output devices through a parallel port, a serial port, a keyboard port, a mouse port, and the like.

Figure 4:
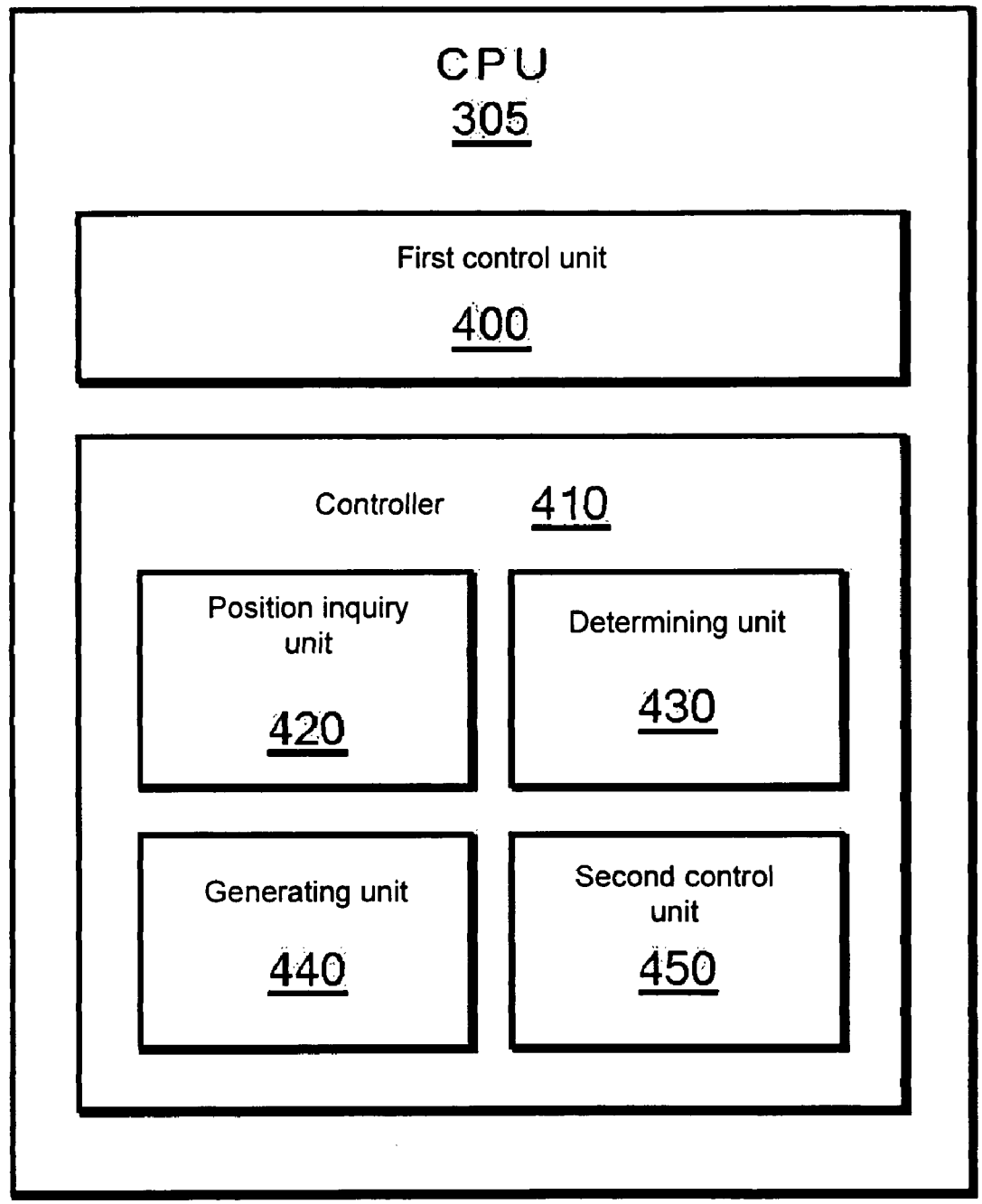
FIG. 4 is a diagram showing an exemplary functional configuration of the host computer 300 according to the present embodiment.

FIG. 4 shows an exemplary functional configuration of CPU 305 according to an embodiment of the present invention. CPU 305, according to the embodiment of the present invention, includes a first control unit 400 and a controller 410. The controller 410 includes a position obtaining unit 420, a determining unit 430, a generating unit 440, and a second control unit 450.

The first control unit 400 sends a head move command and a write command for a head of the tape recording apparatus 100 to the tape recording apparatus 100 through the communication interface 345 (see FIG. 3) to direct the tape recording apparatus 100 to write data. When the data already written on the tape medium 10 is to be overwritten from some point in the middle of the data, the first control unit 400, upon receipt of a response to a move command from the tape recording apparatus 100, provides a notification of the reception to the position inquiry unit 420 in the controller 410, which will be described later. A move command for moving the head of the tape recording apparatus 100 is a command that directs the tape recording apparatus 100 to drive a tape medium 10 to position the head of the tape recording apparatus at an overwrite starting position when the data already written on the tape medium 10 is to be overwritten from some point in the middle of the data. Upon receiving a response to a write command from the tape recording apparatus 100, the first control unit 400 sends data to be written to the tape recording apparatus 100. Upon receiving a notification of completion of the data write from the tape recording apparatus 100 through the communication interface 345, the first control unit 400 provides the notification to the position obtaining unit 420 in the controller 410, which will be described later.

The controller 410 controls writing of data by the tape recording apparatus 100 by using dummy data to ensure that the end position of data to be written on the tape medium 10 or a data overwrite position is always near the beginning of the tape medium 10. This control is performed by the position inquiry unit 420, the determining unit 430, the generating unit 440, and the second control unit 450.

In response to a notification of the end of movement of the tape medium 10 or a notification of completion of writing of data from the first control unit 400, the position inquiry unit 420 records the current position of the head through the communication interface 345. If communication between the host computer 300 and the tape recording apparatus 100 is performed according to a SCSI protocol its ReadPosition command can be used for identifying the current position of the head with respect to the tape medium 10. A tape medium 10 conforming to the LTO standard has a physical mark at intervals of 7.2 mm, which is referred to whenever the tape medium 10 is moved. The position inquiry unit 420 can send the ReadPosition command to the tape recording apparatus 100 to receive a position based on the mark as a response to the command.

The determining unit 430 determines whether the current position of the head with respect to the tape medium 10 is within a predetermined range on the tape medium 10. In this example, the predetermined range is near the beginning of a data write area on the tape medium 10. For an LTO tape medium 10, the range is near the beginning of any of the bands, that is, near LP3 as shown in FIG. 1(c). The beginning of the band is defined by the time allotted for the tape medium 10 to achieve alignment. That is, the beginning of the band is an area across which the head moves on the tape medium 10 while the tape medium is driven from the start point of a writable data area on the tape medium 10 for the allotted time. Information about the predetermined range is stored in the host computer 300 beforehand. For example, information about the predetermined range may contain a starting point and an end point of the range based on the above-described marks provided at intervals of 7.2 mm. The determining unit 430 determines whether the obtained current position on the tape medium 10 is a value between the starting point and the end point.

In response to determination by the determining unit 430 that the current position of the head with respect to the tape medium 10 is not within the predetermined range, the generating unit 440 generates dummy data. The dummy data generated may be any data that can be identified as dummy data during a data read operation. For example, dummy data can be generated by repeating a particular pattern that is usually not used in the host computer 300.

More preferably, the generating unit 440 logs generation of dummy data and holds the log. An example of the log may be information such as the ordinal number for the record at the beginning of dummy data and the ordinal number for the record at the end of the dummy data. A record is data that can be written or read as a unit in the host computer 300. The host computer 300 can avoid reading of dummy data from the tape recording apparatus 100 by referring to the log.

The second control unit 450 directs the tape recording apparatus 100 through the communication interface 345 to write generated dummy data onto the tape medium 10 from the current position obtained in the direction in which the tape medium 10 is running until the current position of the head on the tape medium 10 falls in the predetermined range. For example, the generating unit 440 generates dummy data having a predetermined size. The second control unit 450 directs the determining unit 430 and the generating unit 440 to repeat their respective operation until the determining unit 430 determines that the current position of the head with respect to the tape medium 10 is in the predetermined range. The predetermined size may be a size corresponding to a DS described above as an example.

Figure 5:
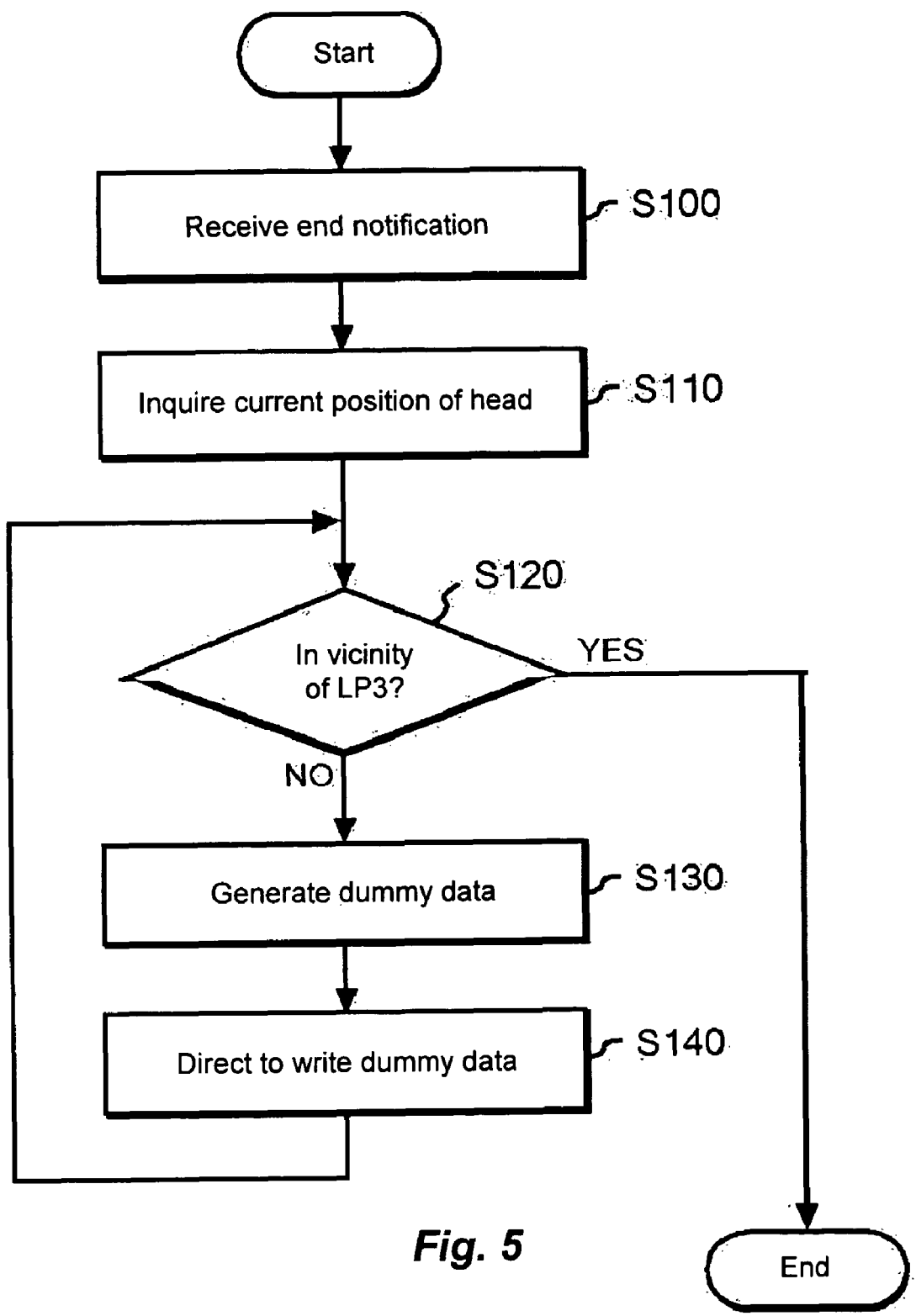
FIG. 5 is a flowchart showing a process flow for controlling writing of data in the host computer 300 according to the present embodiment.

An operation of the host computer 300 according to the present embodiment will be described with reference to the flowchart of FIG. 5. The flowchart shown in FIG. 5 starts with transmission of a head move command or a write command from the host computer 300 to the tape recording apparatus 100. First, at step 100 of FIG. 5, the host computer 300 receives a notification of the end of tape medium 10 movement, or a notification of the completion of writing of data from the tape recording apparatus 100. Either the notification of the end of the movement, or the notification of the end of writing data triggers the next step 110. In step 110 the host computer 300 overwrites the data already written on the tape medium 10 from some point in the middle of the data or appends the data at the end of data already written on the tape medium 10.

When overwriting data, host computer 300 inquires the current position of the head with respect to the tape medium 10 from the tape recording apparatus 100 in response to the notification of the end of movement (step 110) and performs the sequence of processing from step 120 to step 140 prior to sending a data write command to the tape recording apparatus 100. When appending data, the host computer 300 inquires the current position of the head with respect to the tape medium 10 from the tape recording apparatus 100 in response to the notification of the completion of a data write (step 110).

Upon receipt of the current position of the head from the tape recording apparatus 100, the host computer 300 determines whether the current position of the head is within a predetermined range, for example in the vicinity of LP3 (step 120). If the host computer 300 determines that the current position is in the vicinity of LP3 (step 120: YES), the process will end.

On the other hand, if the host computer 300 determines that the current position is not in the vicinity of LP3 (step 120: NO), the process proceeds to step 130, where the host computer 300 generates dummy data having a predetermined size. The host computer 300 then directs the tape recording apparatus 100 to write the generated dummy data on the tape medium 10 (step 140). After step 140, the process returns to step 120 where the host computer 300 repeats the processing from step 120 to step 140 until the current position of the head with respect to the tape medium 10 is within the predetermined range, that is, the determination at step 120 becomes YES.

As described above, when overwriting data, the host computer 300 checks the current position of the head with respect to the tape medium 10 after the head is positioned in the data write position but before the host computer 300 sends a data write command to the tape recording apparatus 100. If the overwrite position is not in the vicinity of the beginning of the data write area of the tape medium 10, the host computer 300 directs the tape recording apparatus 100 to write dummy data until the current position of the head on the tape medium 10 is within the vicinity of the beginning of the data write area.

When appending data, the host computer 300 checks the current position of the head on the tape medium 10 upon completion of writing data by the tape recording apparatus 100. If the end of the data written is not in the vicinity of the beginning of the data write area of the tape medium 10, the host computer 300 directs the tape recording apparatus 100 to write dummy data until the current position of the head with respect to the tape medium 10 is within the vicinity of the beginning of the area.

In either case, the starting position of data written on the tape medium 10 falls in the predetermined vicinity of the tape medium 10. Thus, the time required for alignment during reading and adding data is reduced.

In a second embodiment, the host computer 300 checks the current position of the head with respect to the tape recording apparatus 100 on the tape medium 10 after the head is positioned in the position where data is to be written but before the host computer 300 sends a data write command to the tape recording apparatus 100, regardless of whether the data is to be overwritten from some point in the middle of the data or the data is to be appended at the end of the data already written. In this embodiment, the time required for alignment during reading data is reduced.

Figure 6:
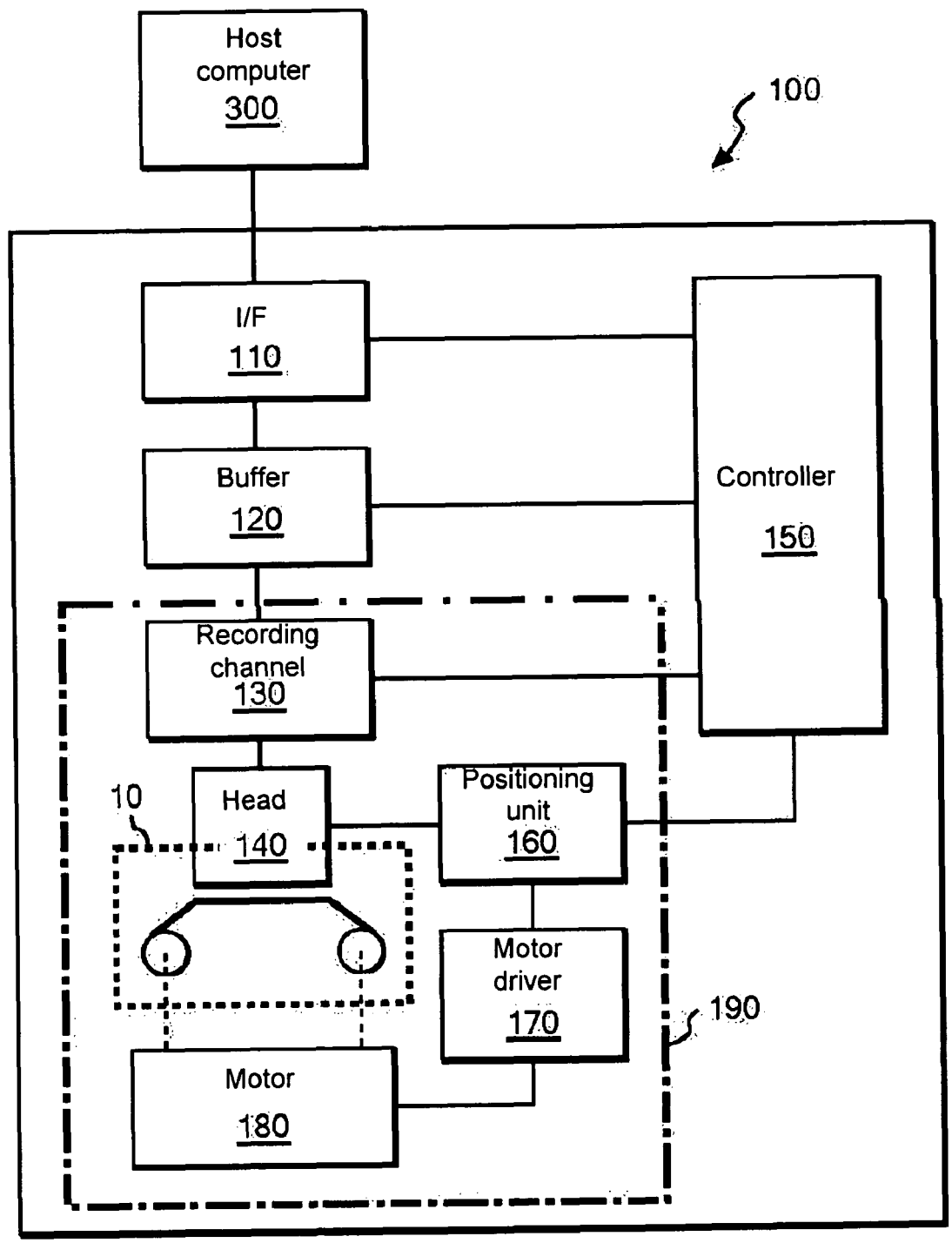
FIG. 6 is a diagram showing an exemplary hardware configuration of tape recording apparatus 100 according to the present embodiment.

FIG. 6 shows an exemplary hardware configuration of a tape recording apparatus 100. The tape recording apparatus 100 includes an interface 110, a buffer 120, a recording channel 130, a read/write head 140, a controller 150, a positioning unit 160, a motor driver 170, and a motor 180.

The communication interface 110 communicates with a host computer 300 through a network. For example, the interface 110 receives a write command from the host computer 300. The interface 110 also receives any read command from the host computer 300.

The buffer 120 is a memory that temporarily stores data to be written to tape medium 10 or data read from tape medium 10. Buffer 120 may be, for example, a DRAM (Dynamic Random Access Memory). The recording channel 130 is a communication channel used for writing data stored in buffer 120 to tape medium 10 or for temporarily storing data read from tape medium 10 into the buffer 120.

The read/write head 140 has a data read/write element and writes and reads data to and from tape medium 10. The read/write head 140, according to the present embodiment, also has a servo read element and reads a signal from a servo track provided on tape medium 10. The positioning unit 160 directs the read/write head 140 to move across the width (in the width direction) of the tape medium 10. The motor driver 170 drives the motor 180.

The controller 150 controls the entire tape recording apparatus 100. That is, the controller 150 controls writing of data to and reading of data from a tape medium 10 according to the command received at the interface. The controller 150 also controls the positioning unit 160 according to a signal read from the servo track. The controller 150 also controls operation of the motor through the positioning unit 160 and the motor driver 170. The motor driver 170 may be directly connected to the controller 150. The recording channel 130, the read/write head 140, the positioning unit 160, the motor driver 170, and the motor 180 will be collectively referred to as the tape drive 190 hereinafter.

The controller 150 uses dummy data to control the data write position and to ensure that the end of data to be written to tape medium 10 or a data overwrite position always falls near the beginning of the tape medium 10. Details of the function will be described later with reference to FIGS. 7 to 9. The controller 150 for example, is implemented by a CPU, a RAM, and a ROM, which are not shown. The ROM stores programs, including a boot program to be executed by the CPU during boot-up of the tape recording apparatus 100 and a control program according to the embodiment of the present invention, for providing the functions described above to the controller 150 after boot-up. The CPU executes these programs through use of the RAM.

Figure 7:
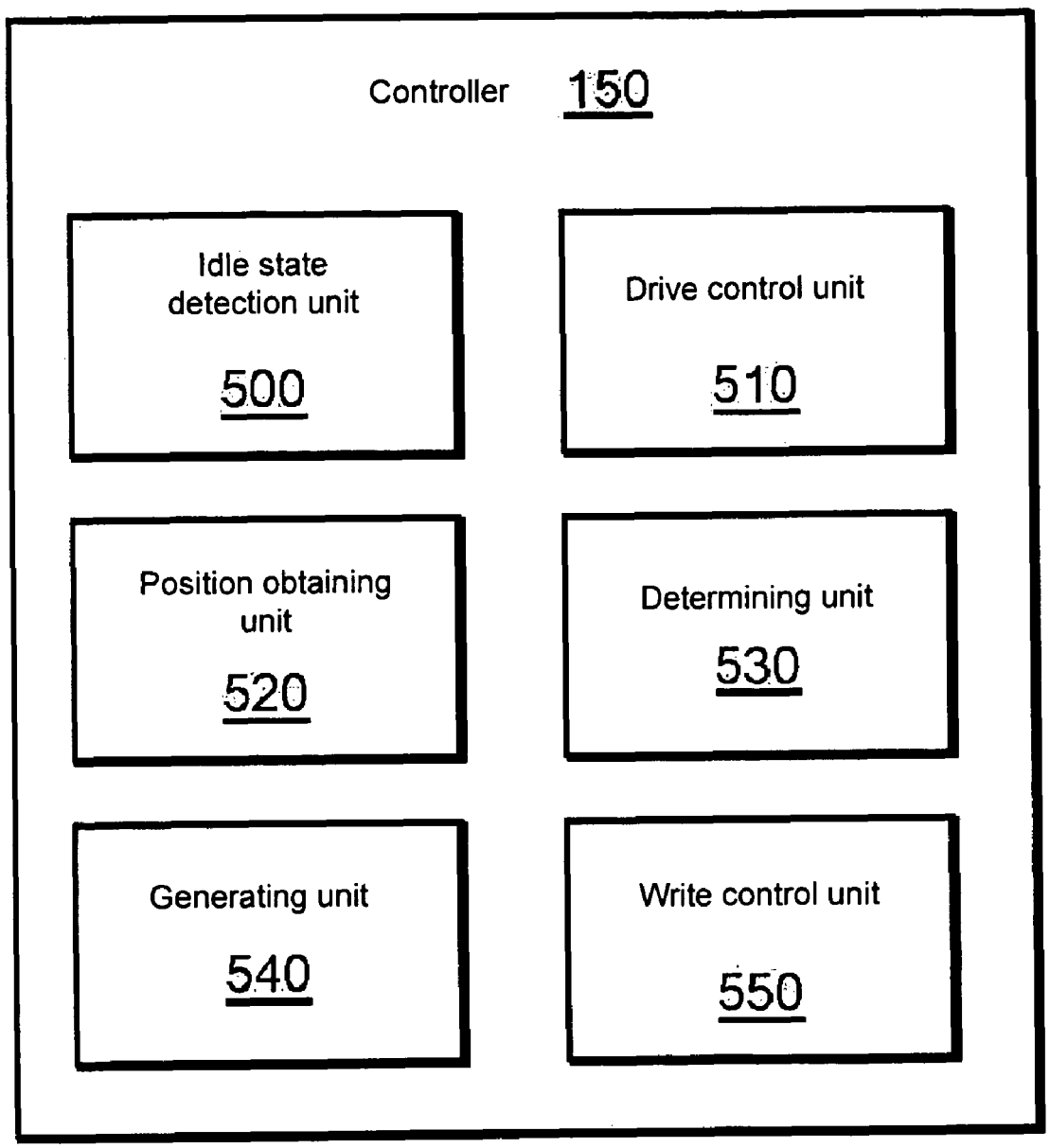
FIG. 7 is a diagram showing an exemplary functional configuration of the tape recording apparatus 100 according to an embodiment.

FIG. 7 shows an exemplary functional configuration of the controller 150 of the tape recording apparatus 100 according to an embodiment of the present invention. As mentioned above, the controller 150 according to the embodiment of the present invention uses dummy data to control a data write position to ensure that the end of data to be written to tape medium 10 or the position where data is to be overwritten always falls near the beginning of the tape medium 10. The controller 150 includes an idle state detecting unit 500, a drive control unit 510, a position obtaining unit 520, a determining unit 530, a generating unit 540, and a write control unit 550.

The idle state detecting unit 500 detects an idle state of the tape recording apparatus 100. The term idle state as used herein refers to a state in which the tape recording apparatus 100 is not performing actions such as data writing or reading. Specifically, the idle state may be detected by detecting that the buffer 120 remains empty for a certain period of time or that the tape recording apparatus 100 has received no command from the host for a certain period of time, for example. When the idle state detecting unit 500 detects the idle state, the idle state detecting unit 500 notifies the drive control unit 510, which will be described later.

In response to detection of the idle state, the drive control unit 510 directs the tape medium 10 to run so that the head 140 (see FIG. 6) is positioned at the end of data already written on the tape medium 10.

In response to the communication interface 110 (see FIG. 6) receiving a special command from the host computer 300, the position obtaining unit 520 obtains the current position of the head 140 of the tape recording apparatus 100 on the tape medium 10. The position obtaining unit 520 obtains the current position by reading a physical mark provided on the tape medium 10 indicating the current position. The special command is issued by the host computer 300 to the tape recording apparatus 100 when writing data that is expected to be quickly accessible for reading. The special command is issued at any of the following timings: (1) immediately after data is written to the tape recording apparatus 100 and (2) immediately before data is written to the tape recording apparatus 100.

The special command may be implemented by using a field called Vendor Specific, for example, if communication between the host computer 300 and the tape recording apparatus 100 is performed in accordance with the SCSI protocol. For example, bits 7 and 6 of byte 5 are provided as the Vendor Specific field in a Write command. A new ID can be provided for a Send Diagnostic command and used as the special command. Furthermore, the special command may be implemented as an all-new command. Implementing the special command is not limited.

Upon receipt of the special command, the tape recording apparatus 100 performs processing required for brining the beginning of data to be written to the beginning of the tape medium 10 through processing by the position obtaining unit 520, the determining unit 530, the generating unit 540, and the write control unit 550. Alternatively, or in addition to this, the position obtaining unit 520 may obtain the current position of the head 140 in response to the end of running tape medium 10 based on detection of the idle state described above. In this case, the write performance of the tape recording apparatus 100 is not affected as viewed from the host computer 300. The function of the idle state detecting unit 500 may be provided by the host computer 300.

The determining unit 530 determines whether the current position of the head 140 is within a predetermined range with respect to tape medium 10. The predetermined range has been described with respect to the first embodiment and therefore the description of which will be omitted here. It is assumed in the second embodiment that the predetermined range is stored in tape recording apparatus 100 beforehand.

The generating unit 540 generates dummy data in response to determination that the current position of the head 140 on the tape medium 10 is not within the predetermined range. The dummy data generated may be any data. The generating unit 540 provides a mark on the dummy data so that the data can be identified as dummy during data reading. A DS descried earlier includes two fields: a data field and a Data Set Information Table (DSIT). The data field is a field in which data is recorded whereas the DSIT is a field containing information about the data field.

For example, the generating unit 540 writes information called END Marker in the beginning of the data field of a DS to indicate that the DS is dummy data. The END Marker is a mark commonly used for indicating that the data in a DS that follows the mark is padded data.

Alternatively, the generating unit 540 may use Bit 1 of Data Set Flags contained in a DSIT. When Bit 1 of Data Set Flags is set, the tape recording apparatus 100 recognizes that the previous DS was overwritten with that DS. Therefore the generating unit 540 can use the DS written at the end of the tape medium 10 as dummy data by keeping Bit 1 set for the DS. The dummy data written is identified as the same data as the previous DS during reading because Bit 1 is set. Consequently, the dummy data is ignored during reading. Retransmission of the same data to the host computer 300 is avoided.

Dummy data to be generated may have a predetermined size such as one DS. In this case, the write control unit 550, which will be described later, directs the determining unit 530 and the generating unit 540 to repeat their respective processing, as described with respect to the second control unit 450 in the first embodiment. Alternatively, the generating unit 540 may calculate the size of dummy data required for the current position of the head 140 to fall within a predetermined range on the tape medium 10 on the basis of the current position of the head on the tape medium 10 obtained by the position obtaining unit 520 and on the direction in which the tape medium 10 is running and generate dummy data having the calculated size.

Figure 8:
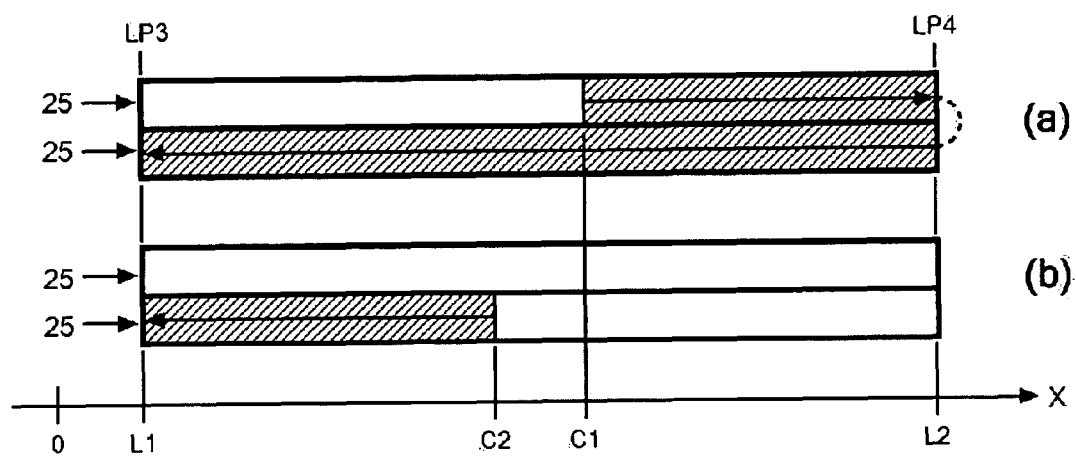
FIG. 8(a) is a diagram showing a tape medium 10 on which data has been partially written.
FIG. 8(b) is a diagram showing the tape medium 10 on which data has been partially written.

Referring to FIG. 8, a method for the generating unit 540 to calculate the size of dummy data will be described below. For this example it is assumed that the X-axis in FIG. 8 is parallel to the length of a tape medium 10 and is marked in 7.2 mm increments. For simplicity of calculation, the predetermined range here is represented by a single point, LP3. It is also assumed that the obtained current position of the head 140 on the tape medium 10 is C1 and the tape medium 10 is running in the direction from LP3 toward LP4, as shown in FIG. 8(a). In this case, in order for the current position of the head with respect to tape medium 10 to reach LP3 from C1 by moving along the direction from LP3 toward LP4, dummy data equivalent to the shaded portion in FIG. 8(a) is required. That is, the size L of the dummy data is L=(L2−C1)+(L2−L1).

In FIG. 8(b) the obtained current position of the head 140 with respect to tape medium 10 is C2 and tape medium 10 is running in the direction from LP4 toward LP3. In this case, in order for the current position of the head 140 on the tape medium 10 to reach LP3 from C2 by moving along the direction from LP4 toward LP3, dummy data equivalent to the shaded portion shown in FIG. 8(b) is required. That is, the size L of dummy data to be obtained is L=C2−L1.

The write control unit 550 writes dummy data on the tape medium 10 in the direction in which the tape medium 10 is running, starting from the obtained current position, until the current position of the head 140 on the tape medium 10 falls within the predetermined range. If generating unit 540 generates dummy data having a predetermined size as described above, the write control unit 550 directs the determining unit 530 to determine whether the head 140 is positioned in the predetermined range each time the dummy data having the predetermined size is written to tape medium 10. If the generating unit 540 calculates the size of dummy data required for the current position of the head 140, with respect to tape medium 10, to fall within the predetermined range and generates dummy data having the calculated size, the write control unit 550 simply writes the generated dummy data.

Figure 9:
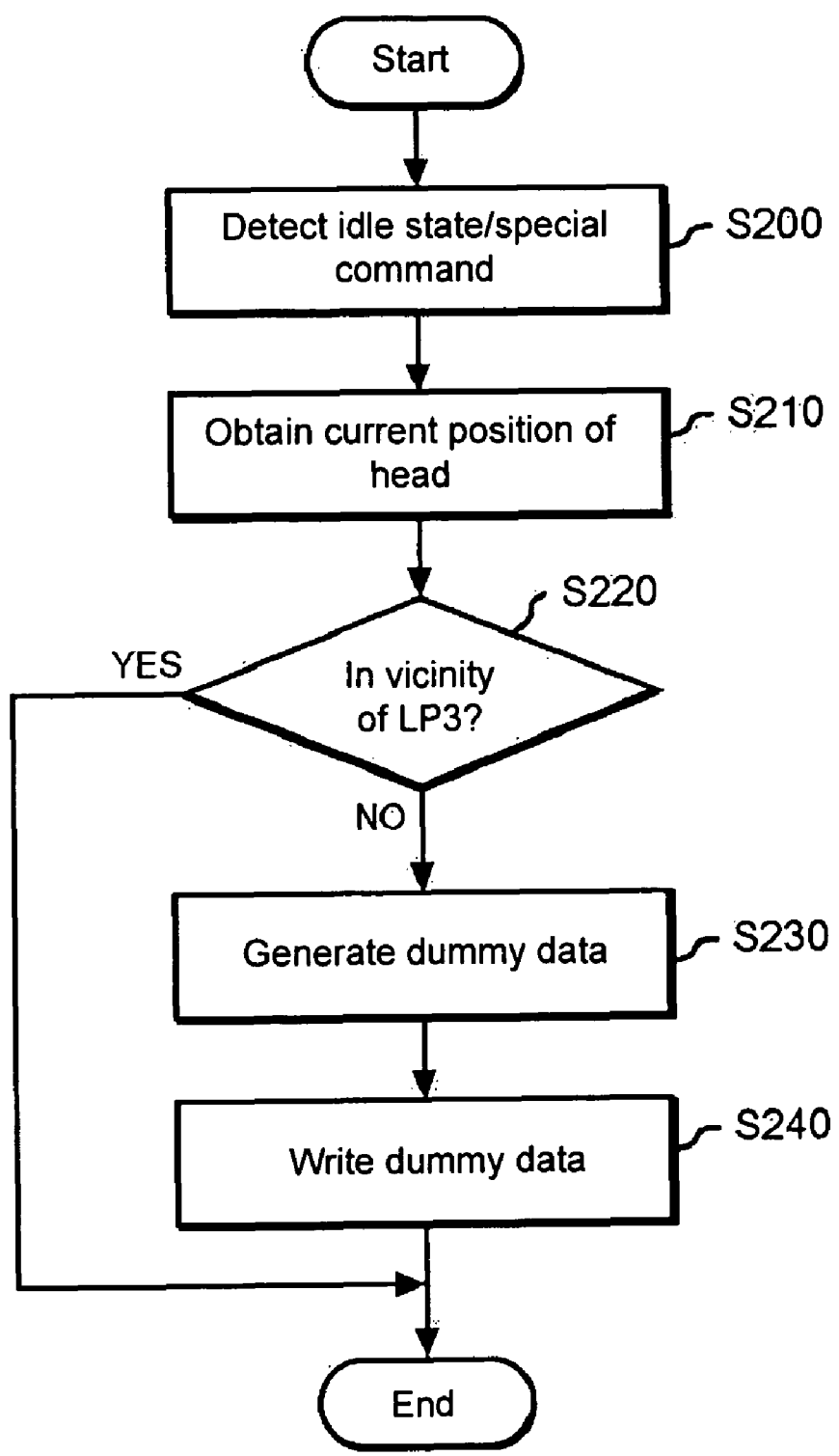
FIG. 9 is a flowchart showing a process flow for controlling writing of data in the tape recording apparatus 100 according to an embodiment.

An operation of the tape recording apparatus 100 according to the present embodiment will be described below with reference to a flowchart in FIG. 9. In response to detection of an idle state of the tape recording apparatus 100, or receipt of a special command from the host computer 300 (step 200), the tape recording apparatus 100 obtains the current position of the head 140 with respect to tape medium 10. In the present exemplary embodiment, the tape recording apparatus 100 also obtains the current direction in which the tape medium 10 is running.

The tape recording apparatus 100 determines whether the current position of the head 140 is within a predetermined range with respect to tape medium 10, for example, in the vicinity of LP3 (step 220). If the tape recording apparatus 100 determines that the current head position is in the vicinity of LP3 (step 220: YES), the process will end.

If the tape recording apparatus 100 determines that the current head position is not in the vicinity of LP3 (step 220: NO), the process proceeds to step 230, where the tape recording apparatus 100 calculates the size of dummy data required for the current position of the head 140 with respect to tape medium 10 to fall in the predetermined range and generates dummy data having the calculated size. Finally, control unit 550 writes the generated dummy data to tape medium 10 (step 240). Subsequently the process ends.

As has been described above, the present invention can be implemented in any tape recording apparatus 100 that drives a tape medium 10 to run in both forward and reverse directions to record data and a host computer 300 connected to the tape recording apparatus 100 through a network 200. Implementation of the present invention in the tape recording apparatus 100 is advantageous in the performance of writing dummy data. Implementation of the present invention in the host computer 300 is advantageous in any type of tape drive.

While the present invention has been described with respect to embodiments thereof, the technical scope of the present invention is not limited to the embodiments described above. For example, the predetermined range used as the criterion for determination as to whether the position of the end of data to be written on a tape medium 10 or the overwrite position of data should be adjusted or not is defined by the time allowed for the tape medium 10 to achieve alignment in the embodiments described above. However, if the amount of data that can be written on a tape medium 10 is important, another criterion for the determination may be added. For example, it may be desired in some cases that the influence of writing dummy data on the capacity of a tape medium 10 is limited to below 10%. In that case, a configuration may be added in which the total amount of dummy data is compared with the total amount of data already written on the tape medium 10 and, once the total amount of the dummy data exceeds 10% of the total amount of the data written on the tape medium 10, dummy data is not written.

Alternatively, a configuration may be used in which dummy data is written only when the tape medium 10 runs in the direction from LP4 to LP3, the size of the dummy data is limited to up to 20% of the entire length of the tape medium 10, and dummy data is written only once while the tape medium 10 is running from LP4 to LP3. Trading the performance of alignment for the capacity of tape medium 10, the predetermined range may simply range from the beginning of the tape medium 10 to the midpoint between LP3 and LP4. Thus, it will be apparent to those skilled in the art that various modifications and improvements can be made to the embodiments described above. Therefore, it will be understood that embodiments to which such modifications or improvements are made are also included in the technical scope of the present invention.

The invention claimed is:

1. An apparatus configured to drive a tape medium in both forward and reverse directions along the length of the tape medium and to record data on the tape medium, comprising:
   a position obtaining unit for obtaining a current position of a head of the tape recording apparatus with respect to the tape medium;
   a determining unit for determining whether the current position of the head is within a predetermined range with respect to a point on the tape medium;
   a generating unit for generating dummy data in response to a determination that the current position of the head is not within the predetermined range; and
   a write control unit for writing the dummy data on the tape medium until the current position of the head is within the predetermined range.

2. The apparatus according to claim 1, wherein the tape medium comprises a plurality of bands arranged along the length of the tape medium and the predetermined range is a portion of the beginning of any of the bands.

3. The apparatus according to claim 1, wherein the generating unit generates dummy data having a predetermined size; and
   the write control unit directs both the determining unit and the generating unit to repeat their respective processing until it is determined that the current position of the head with respect to the tape medium is within the predetermined range.

4. The apparatus according to claim 3, wherein the generating unit calculates the size of dummy data required for the current position of the head on the tape medium to fall within the predetermined range using the current position of the head and the direction in which the tape medium is running, and generates dummy data having the calculated size.

5. The apparatus according to claim 1, further comprising an idle state detecting unit for detecting an idle state of the tape recording apparatus and a drive control unit to drive the tape medium in response to detection of the idle state so that the head is positioned at the end of data already written;
   wherein the position obtaining unit obtains the current position of the head with respect to the tape medium when the tape medium stops running.

6. The apparatus of claim 1, further comprising:
   a communication unit for communicating with a host computer through a network;
   wherein the position obtaining unit obtains the current position of the head with respect to the tape medium in response to receiving a special command at the communication unit from the host computer.

7. The apparatus of claim 6, further comprising:
   a first control unit for sending a move command for moving the head of the tape recording apparatus and sending a write command to the tape recording apparatus through the communication unit to direct the tape recording apparatus to write data; and
   wherein the position obtaining unit obtains the current position of the head with respect to the tape medium through the communication unit in response to receipt of a notification of the end of movement of the head on the tape medium after running the tape medium, or a notification of the completion of the data write operation from the first control unit; and
   a second control unit for directing the tape recording apparatus, through the communication unit, to write the dummy data on the tape medium until the current position of the head on the tape medium is within the predetermined range.

8. The apparatus of claim 1, including:
   a unit configured to drive the tape medium in both forward and reverse directions along the length of the tape medium and to record the data on the tape medium.

9. The apparatus of claim 8, wherein the unit configured to drive the tape medium moves the tape in multiple loops in a first data band of a block of the tape medium, then moves the tape in multiple loops in a second data band of the block of the tape medium, then moves the tape in multiple loops in a third data band of the block of the tape medium and then moves the tape in multiple loops in a fourth data band of the block of the tape medium.

10. The method of claim 8, wherein obtaining the current position of the head with respect to the tape medium occurs after receiving a notification that the head movement has ended, or a notification from the tape apparatus that the data write is complete.

11. A method for controlling writing of data onto a tape medium by a tape recording apparatus configured to drive the tape medium in both forward and reverse directions along the length of the tape medium, comprising:
   obtaining a current position of a head of the tape recording apparatus with respect to the tape medium;
   determining whether the obtained current position of the head is within a predetermined range on the tape medium;
   generating dummy data in response to a determination that the obtained current position of the head is not within the predetermined range; and
   writing the dummy data on the tape medium until the current position of the head with respect to the tape medium is within the predetermined range.

12. A computer program product comprising a computer useable storage medium including a computer readable program thereon, wherein the computer readable program when executed on a computer cause the computer to execute a method for to controlling writing of data on a tape medium by a tape recording apparatus which drives the tape medium in both forward and reverse directions along the length of the tape medium, the program causing the tape recording apparatus connected to a host computer through a network to perform, the method comprising:
   obtaining a current position of a head of the tape recording apparatus with respect to the tape medium in response to receiving a special command from the host computer;
   determining whether the obtained current position of the head is in a predetermined range on the tape medium;
   generating dummy data in response to determination that the obtained current position of the head is not within the predetermined range; and
   writing dummy data on the tape medium until the current position of the head with respect to the tape medium is within the predetermined range.

13. The method of claim 11, including:
   calculating the size of dummy data required for the current position of the head on the tape medium to fall within the predetermined range using the current position of the head and the direction in which the tape medium is running; and
   generating the dummy data having the calculated size.

14. The method of claim 1, including:
   detecting an idle state of the tape recording apparatus;
   driving the tape medium in response to detection of the idle state so that the head is positioned at the end of data already written; and
   obtaining the current position of the head with respect to the tape medium when the tape medium stops running.

15. The computer program product of claim 12, wherein the step of obtaining the current position of the head with respect to the tape medium occurs after receiving a notification that the head movement has ended, or a notification from the tape apparatus that the data write is complete.

16. The computer program product of claim 12, the method including:
   calculating the size of dummy data required for the current position of the head on the tape medium to fall within the predetermined range using the current position of the head and the direction in which the tape medium is running; and
   generating the dummy data having the calculated size.

17. The computer program product of claim 12, the method including:
   detecting an idle state of the tape recording apparatus;
   driving the tape medium in response to detection of the idle state so that the head is positioned at the end of data already written; and
   obtaining the current position of the head with respect to the tape medium when the tape medium stops running.

* * * * *